(No Model.)

H. LOWENBERG.
Pantaloons.

No. 232,196. Patented Sept. 14, 1880.

Witnesses:
Saml R Turner
E. C. Bates

Inventor
Harris Lowenberg
By Mills & Sathrap
Atty's

N. PETERS, PHOTO-LITHOGRAPHER, WASHINGTON, D. C.

United States Patent Office.

HARRIS LOWENBERG, OF NEW YORK, N. Y.

PANTALOONS.

SPECIFICATION forming part of Letters Patent No. 232,196, dated September 14, 1880.

Application filed June 1, 1880. (No model.)

*To all whom it may concern:*

Be it known that I, HARRIS LOWENBERG, a citizen of the United States, residing at New York, in the county of New York and State of New York, have invented certain new and useful Improvements in Pantaloons and Overalls; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of inventions known as "pantaloons," "overalls," and "drawers;" and it consists, principally, in providing a fly of one continuous piece of material, said fly portions being formed at right angles to one another, and provided with a cord inserted on the inner edge of the same, and dispensing with the usual crotch and rising pieces, for the purposes herein explained, and pointed out in the claim.

The annexed drawings, to which reference is made, fully illustrate my invention, in which—

Figure 1:
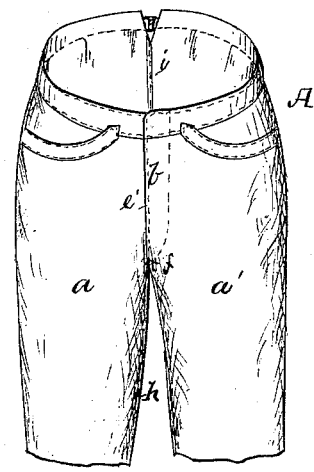
Figure 2:
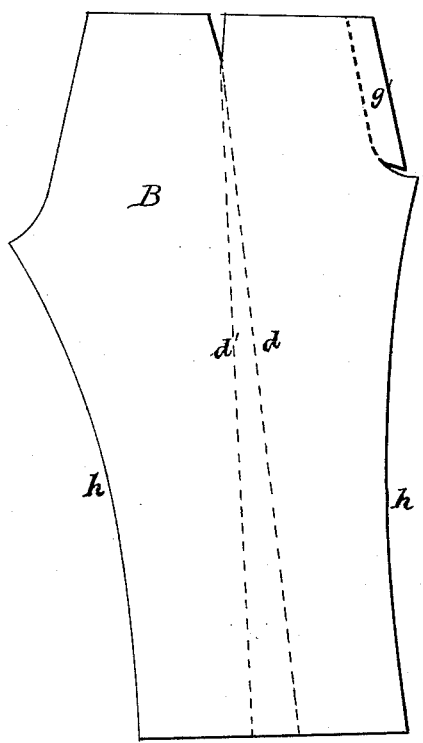
Figure 3:
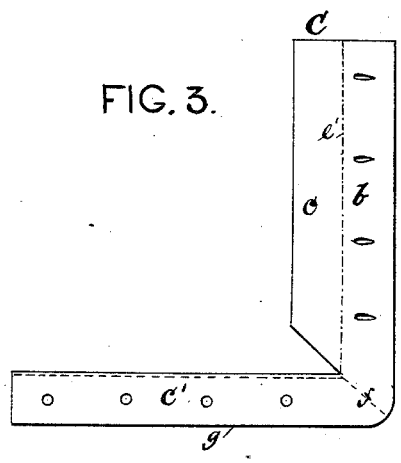
Figure 4:
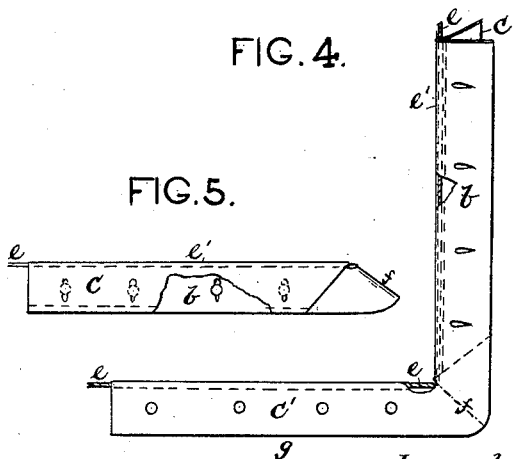
Figure 5:

Figure 1 represents a perspective view of my improved pantaloons. Fig. 2 represents a side view of one leg in blank form. Figs. 3, 4, and 5 are detail views of the fly detached.

A designates a pair of pantaloons or overalls, composed of two pieces of material united to one another, forming the legs $a\ a'$, by an inner seam, $h$, connecting with the usual seat-seam $i$, as shown in Fig. 1 of the drawings.

B designates one leg of a pair of pantaloons in blank form, having the desired curvature, and so constructed and arranged as to allow of sufficient material to be drawn in order to encircle a cord that is secured on the outside of each leg $a\ a'$, thereby forming a tuck, as shown in dotted lines $d\ d'$; also, the portion $g'$ forms a flap, which is a part of the material, and cut in the desired shape to form the flap or opening of the pantaloons, as shown in Fig. 2.

C designates the fly, made of one continuous piece, the portions $b\ c'$ being at right angles to one another, and having a flap, $c$, made on the portion $b$ aforesaid. Said portion $b$ is provided with suitable button-holes, while the portion $c'$ is provided with buttons. The cord $e$ is inserted on the inner edge of the fly C, as shown in Fig. 4 of the drawings, and when applied to the pantaloons, overalls, or other garment, the fly is overlapped, as shown in Fig. 5 of the drawings.

Having thus given a description of the different parts, and the manner in which they are cut before being made up, I will now proceed and explain the mode in which the pantaloons are made and the fly is applied thereto.

It will be observed that when the two halves of the pantaloons are united to one another the seam $h$ comes between and on the inside of the legs $a\ a'$, while the outer side of said legs are seamless, and in lieu thereof are formed tucks having the cord $e$ secured therein, as hereinbefore mentioned.

The fly portion of said pantaloons is made in the following manner: The flap $g'$, after being cut, as described, is folded inwardly, after which the fly-piece C is folded over the cord $e$ at the dotted line $e'$, after which said fly is sewed to the garment on each side of the opening in the pantaloons, at the same time sewing the flap $g'$ between said fly-piece and the garment.

Again, it will be seen that when the garments are completed the fly-piece extends from one side of the opening to the other, a continuous piece made in the form of a letter L and folded as indicated by dotted lines at $f$, thus overlapping when in use, which presents a smooth surface; also, it will appear that the fly, being cut as shown in Fig. 3, gives symmetry and form to the front portion or facing of the garment, and the cord $e$ being inserted as described serves to strengthen the button-holes, as well as keep the fly in proper shape; and furthermore, by my mode of cutting out garments I dispense with crotch and rising pieces, thus saving material in cutting, there being no waste, only what is necessary to furnish the trimmings.

Pantaloons and overalls constructed as set forth are not only durable, but easily made and nicely fitted to the wearer.

I am aware that pantaloons or overalls have been provided with a fly or facing of the sides of the front of the garment and made in one straight continuous strip or piece, and secured in place on the edges of the front opening to the main portion of the same, and therefore do not claim such broadly; but What I do claim is—

In pantaloons or overalls, the fly C, constructed of one piece, the two portions $b\ c'$ being at right angles to one another, and provided with the flap $c$, and having the cord $e$ secured thereto, substantially as and for the purposes set forth.

In testimony whereof I affix my signature in presence of two witnesses.

HARRIS LOWENBERG.

Witnesses:
 A. C. RICHARDS,
 G. RICHARDS.